United States Patent
Sare et al.

(10) Patent No.: US 7,534,736 B2
(45) Date of Patent: May 19, 2009

(54) ULTRA-LOW RESIDUE, HIGH SOLIDS, WET CAKE PRODUCTS AND METHODS OF MAKING SAME

(75) Inventors: Edward Sare, Macon, GA (US); James Stacey Johnson, Cochran, GA (US)

(73) Assignee: Imerys Kaolin, Inc., Dry Branch, GA (US)

( * ) Notice: Subject to any disclaimer, the term of this patent is extended or adjusted under 35 U.S.C. 154(b) by 261 days.

(21) Appl. No.: 11/136,587

(22) Filed: May 25, 2005

(65) Prior Publication Data

US 2006/0009348 A1 Jan. 12, 2006

Related U.S. Application Data

(60) Provisional application No. 60/578,315, filed on Jun. 10, 2004.

(51) Int. Cl.
*C04B 35/00* (2006.01)

(52) U.S. Cl. .................. 501/141; 501/144; 501/145; 106/486

(58) Field of Classification Search ................ 106/486; 501/141, 144, 145; 264/177.12
See application file for complete search history.

(56) References Cited

U.S. PATENT DOCUMENTS

| | | | |
|---|---|---|---|
| 3,586,523 A | 6/1971 | Fanselow et al. | |
| 3,661,515 A | 5/1972 | Iannicelli et al. | |
| 3,736,165 A | 5/1973 | Sawyer, Jr. et al. | |
| 4,246,039 A | 1/1981 | Mixon, Jr. | |
| 4,687,546 A * | 8/1987 | Willis | 159/2.1 |
| 4,997,550 A * | 3/1991 | Cobb et al. | 209/166 |
| 5,120,465 A | 6/1992 | Sare et al. | |
| 5,223,463 A | 6/1993 | Bilimoria et al. | |
| 5,328,506 A * | 7/1994 | Crumbley et al. | 106/416 |
| 5,516,364 A | 5/1996 | Brantley et al. | |
| 5,593,490 A * | 1/1997 | Etheridge et al. | 106/484 |
| 5,792,251 A | 8/1998 | Smiley et al. | |
| 5,840,113 A | 11/1998 | Freeman et al. | |
| 5,846,309 A | 12/1998 | Freeman et al. | |
| 5,922,207 A | 7/1999 | Willis et al. | |
| 5,997,874 A | 12/1999 | Koike et al. | |
| 6,238,473 B1 | 5/2001 | Maxwell et al. | |
| 6,284,705 B1 * | 9/2001 | Park et al. | 502/417 |
| 6,514,333 B1 | 2/2003 | Yuan et al. | |
| 6,585,822 B2 | 7/2003 | Berube et al. | |
| 6,602,341 B1 * | 8/2003 | Hogg | 106/468 |
| 7,122,080 B2 * | 10/2006 | Pruett et al. | 106/487 |
| 2002/0088376 A1 * | 7/2002 | Sare et al. | 106/486 |
| 2003/0019399 A1 | 1/2003 | Malla et al. | |
| 2004/0116274 A1 * | 6/2004 | Sare et al. | 501/141 |

* cited by examiner

*Primary Examiner*—Pegah Parvini
(74) *Attorney, Agent, or Firm*—Finnegan, Henderson, Farabow, Garrett & Dunner, LLP

(57) ABSTRACT

Disclosed herein is ultra-low residue, high solids, wet "cake" kaolin and ultra-low residue, high solids, wet "cake" calcined kaolin products, produced by use of wet screening/non-drying product isolation, which are useful in the manufacture of top size-sensitive applications.

23 Claims, No Drawings

ULTRA-LOW RESIDUE, HIGH SOLIDS, WET CAKE PRODUCTS AND METHODS OF MAKING SAME

This application claims priority to U.S. Provisional Patent Application No. 60/578,315, filed Jun. 10, 2004, and is incorporated herein by reference.

The present invention relates to novel mineral compositions, such as kaolins, having low residue, methods for making such compositions, and their uses, such as the manufacture of top size-sensitive applications, such as ceramic honeycomb automotive substrates, polymers, and rubbers. The method for achieving such novel mineral compositions is also disclosed.

Kaolin is a white industrial mineral, which has found use in a wide range of applications. Large deposits of kaolin clay exist in Devon and Cornwall, England, Brazil, China, Australia and in the states of Georgia and South Carolina, United States of America.

Particulate kaolins occur naturally in the hydrous form and exist as crystalline structures containing hydroxyl functionality. Particulate kaolins may be converted to a calcined form by thermal processes. Such processes cause the particulate kaolin to dehydroxylate. During calcination, the hydrous kaolin converts from a crystalline to an amorphous form. Further, during calcination, aggregation typically occurs.

Hydrous kaolins that can be used in the present invention can be obtained naturally from various locations, such as from the Rio Capim area of Brazil and Georgia of the United States.

Generally, the properties of both hydrous and calcined kaolin are dependent on attributes, such as particle size (expressed in terms of particle size distribution, or PSD), shape, and texture of the individual particles and of agglomerates thereof.

"Calcined kaolin" as used herein refers to a kaolin that has been converted from the corresponding (naturally occurring) hydrous kaolin to the dehydroxylated form by thermal methods. Calcination changes, among other properties, the kaolin structure from crystalline to amorphous. Calcination is effected by heat-treating coarse or fine hydrous kaolin in known manner, e.g., at temperatures ranging from 500° C. to 1200° C., such as temperatures ranging from 800° C. to 1200° C.

The degree to which hydrous kaolin undergoes changes in crystalline form can depend upon the amount of heat to which the hydrous kaolin is subjected. Initially, dehydroxylation of the hydrous kaolin can occur upon exposure to heat. At temperatures below a maximum of about 850-900° C., the product is often considered to be virtually dehydroxylated, with the resultant amorphous structure commonly referred to as a metakaolin. Frequently, calcination at this temperature is referred to "partial calcination," and the product may also be referred to as "partially calcined kaolin." Further heating to temperatures above about 900-950° C. can result in further structural changes, such as densification. Calcination at these higher temperatures is commonly referred to as "full calcination," and the product is commonly referred to as 'fully calcined kaolin'.

"Calcined" (or "calcination"), as used in herein, may encompass any degree of calcination, including partial (meta) and/or full and/or flash calcination.

Calcined kaolin products typically include a small percentage of oversize particles that can have undesirable effects when used in ceramics and can cause blockage of the die in extrusion processes. These oversize particles will generally be retained on a 325 mesh screen and are commonly referred to as +325 mesh residue (or just "residue" herein).

The current method for producing a lower residue product is to process the dry standard material through screens to yield the desired residue results. However, there remains a need for kaolins for "cleaner," lower residue product for use, for example, in thin-walled catalyst production.

One aspect of the present disclosure is a kaolin wet cake, comprising flocculated kaolin having a solids content of at least 50% and a +325 mesh residue content of less than or equal to about 50 ppm, such as 20 ppm, 10 ppm, 5 ppm, 2 ppm, and 1 ppm; wherein the kaolin has been wet screened and dewatered, and has a moisture content of greater than or equal to 10%, such as greater than 15%, or 20% subsequent to wet-screening.

According to the present disclosure, the feed and slurry may comprise kaolin chosen from hydrous and calcined kaolin. "Chosen from" or "selected from" as used herein refers to selection of individual components or the combination of two (or more) components. For example, the feed and slurry can comprise hydrous kaolin only, calcined kaolin only, or a mixture of hydrous and calcined kaolins.

Another aspect of the present disclosure is a method for producing a ceramic body, comprising: screening a fluid kaolin slurry; flocculating the fluid kaolin slurry; dewatering the flocked kaolin slurry to obtain a kaolin wet cake having a solid content of at least 50% and having a +325 mesh residue content of not more than about 50 ppm; and forming the kaolin wet cake into a ceramic body, wherein the kaolin is not dried to a moisture content of less than 10%, less than 15%, or even less than 20%, at any time between screening and forming.

In one aspect, the kaolin wet cake has a residue content of less than or equal to about 20 ppm, such as 10 ppm, 5 ppm, 2 ppm, and 1 ppm.

In another aspect, the fluid kaolin slurry comprises percent solids ranging from about 25% to about 75% solids, such as about 60%, as measured by a CEM AVC-80 microwave solids tester and standard lab operating procedure. The CEM microwave solids tester is a combination microwave oven and four-place analytical balance controlled by an integrated computer. Manufacturer supplied glass fiber pads are the vehicles used to introduce and contain the samples to be tested. Two glass fiber pads are placed on the balance tripod inside the microwave chamber, and the balance is zeroed using the "tare" function key. The pads are then removed and about two grams (total) of sample are placed directly on the pads using transfer pipettes. The pads (containing the sample) are then placed back on the tripod inside the microwave chamber and the machine is started using the "test" function key. The instrument then starts a drying cycle and internally calculates the percent solids of the sample using the weight differential. The results (percent solids) are shown on the display screen.

The particle size distribution of a kaolin slurry may be determined by measuring the sedimentation speeds of the dispersed particles of the particulate product under test through a standard dilute aqueous suspension using a SEDIGRAPH™, e.g., SEDIGRAPH 5100, obtained from Micromeritics Corporation, USA. The size of a given particle can be expressed in terms of the diameter of a sphere of equivalent diameter (esd), which sediments through the suspension. The SEDIGRAPH graphically records the percentage by weight of particles having an esd less than a particular esd value, versus that esd value.

"Mean particle diameter" is defined as the diameter of a circle that has the same area as the largest face of the particle.

The mean particle size, $d_{50}$ value, and other particle size properties referred to in the present application are measured in a well known manner by sedimentation of the particulate material in a fully dispersed condition in an aqueous medium using a SEDIGRAPH 5100. The mean particle size $d_{50}$ is the value determined in this way of the particle esd at which there are 50% by weight of the particles, which have an esd less than that $d_{50}$ value.

Another aspect provides a fluid kaolin slurry having a particle size distribution of:
- at least about 60%, such as 70% and 75%, of the particles by weight have an esd of less than about 10 µm;
- at least about 5%, such as 10% and 15%, of the particles by weight have an esd of less than about 2 µm;
- at least about 3%, such as 4% and 6%, of the particles by weight have an esd of less than about 1 µm.

According to the present disclosure, the slurry undergoes a screening process prior to flocculation. In one aspect, the screening process comprises passing the slurry through a 325 mesh screen or finer screen. In another aspect, the screening process comprises passing the slurry through a 400 mesh screen or finer screen, such as a 600 mesh screen or finer.

The kaolin slurry to be screened can be prepared by blunging crude or processed kaolin clay with water to form an aqueous suspension. In one embodiment, the slurry further comprises at least one dispersant. The at least one dispersant can be present in an amount effective to fluidize the slurry, for example in an amount ranging from about 0.01% to about 2% by weight, relative to the total weight of the slurry, such as an amount ranging from about 0.01% to about 1% by weight.

In one aspect, a dispersing agent is added to the slurry before flocculation, resulting in a pH that is greater than or equal to about 6.5, such as a pH ranging from 8 to 10. To achieve the desired pH, the composition can further comprise at least one water-soluble pH modifier. Non-limiting examples of suitable pH-modifiers include sodium carbonate, ammonium carbonate, amino-2-methyl-1-propanol, sodium silicate, sodium hydroxide, and ammonium hydroxide.

Dispersants may also be chosen from art recognized organic polymeric dispersants that are traditionally used in kaolin-containing compositions. Appropriate dispersants will be readily apparent to the skilled artisan. For example, dispersants may be chosen from polyelectrolytes such as polyacrylates and copolymers comprising polyacrylate species, for example polyacrylate salts (such as sodium, ammonium and potassium salts), sodium hexametaphosphates, polyphosphoric acid, condensed sodium phosphate, alkanolamines, and other reagents commonly used for this function. Other non-limiting examples of suitable dispersants include 2-amino-2-methyl-1-propanol, tetrasodium pyrophosphate, trisodium phosphate, tetrasodium phosphate, sodium tripolyphosphate, sodium silicate, sodium carbonate, sodium or potassium salts of weak acids, such as condensed naphthalene sulfonic acid and polymeric carboxylic acid, and water-soluble organic polymeric salts, such as sodium or ammonium polyacrylate, and polymethacrylates such as sodium or ammonium polymethacrylate.

In still another aspect, the kaolin wet cake, formed as disclosed herein, has a $K_2O$ content of less than about 2,500 ppm, such as less than about 2000 ppm, less than about 1500 ppm or even less than about 650 ppm.

As stated, the fluid kaolin slurry is flocculated, typically by lowering the pH of the fluid kaolin slurry to less than or equal to about 5, such as less than or equal to about 4.5. This downward pH adjustment can be accomplished by simply adding an appropriate amount of an acid, such as for example sulfuric acid, alum or other suitable acid.

In one embodiment, the flocced kaolin slurry may be dewatered in one of the ways well known in the art, e.g. filtration such as via rotary filter or filter press, centrifugation, evaporation and the like, provided that the slurry has a moisture content of greater than or equal to 10%, such as 15% and 20%, at all points between the flocculating and forming processes. Dewatering can also be accomplished with a filter press. Whatever the process, it is understood that wherein the kaolin is not dried to a moisture content of less than 10%, less than 15%, or even less than 20%, at any time between screening and forming.

Even further disclosed herein are ceramic body filter cakes, greenware products, extruded ceramic bodies, and catalyst substrates comprising a flocculated kaolin having a solids content of at least 50% and a 325 mesh residue content less than or equal to about 50 ppm; wherein the kaolin has been wet screened and dewatered, and has a moisture content greater than or equal to 10% subsequent to the wet-screening process.

Still further disclosed herein are cast ceramic ware products made from a kaolin wet cake comprising a flocculated kaolin having a solids content of at least 50% and a 325 mesh residue content less than or equal to 50 ppm; wherein the kaolin has been wet screened and dewatered, and has a moisture content greater than or equal to 10% subsequent to wet-screening.

In one aspect, the ceramic composition can comprise a kaolin blend. For example, the kaolin can be blended with other minerals known in the art such as, talc, halloysite, calcium carbonate, titanium dioxide, gypsum, feldspar, nepheline syenite, silica and the like.

In another embodiment, additional components, such as biocides, may be added to the fluid kaolin slurry.

Even further disclosed herein are products formed by casting, rolling, molding, pressing, and extrusion.

Extrusion is a forming method that is commonly used in the production of complex ceramic objects such as the intricate honeycomb ceramics used as substrate supports in automotive catalytic converters. One skilled in the art will recognize that extrusion may be carried out in a number of different ways, such as, for example, the methods disclosed in U.S. Pat. No. 3,885,977 to Lachman, U.S. Pat. No. 5,332,703 to Hickman et al., or U.S. Pat. No. 5,997,984 to Koike et al.

Slip casting is typically used in production of products having complex shapes and where plastic forming or semi-dry pressing are not possible. Thus, slip casting is applicable to the production of, for example, hollow tableware, figures and ornamental ware, and sanitary ware. For whiteware production, 'jiggering' can also be used to produce ware. Slip casting involves the use of a mold of appropriate shape into which a fluid suspension of a body can be poured and wherein the mold progressively extracts some of the water until a solid layer is formed.

Two primary methods are typically employed for slip casting: drain casting and solid casting. In drain casting, a mold is filled with slip and casting takes place on one surface only. After a suitable time, during which the desired cast thickness is built up, the excess slip is poured off. The mold and cast are then partially dried, to allow mold release, after which the cast can be trimmed, cut or sponged. In solid casting, which is typically used for products having varying wall thicknesses, the mold is filled with slip and casting takes place on both surfaces. The removal of water generally means that the slip has to be topped up during the casting. For complex shapes, the mold can be constructed in several sections.

As stated, the method described herein may include a screening process that comprises passing the slurry through a 325 mesh screen. The +325 mesh residue may be measured using standard lab operating procedures. This procedure includes using 100 g (dry basis) material in approximately 3,500 ml filtered water to which 60 mls of trisodium polyphosphate (5% strength) have been added.

The kaolin sample is then added and mixed vigorously for 20 minutes using a standard lab mixer with good agitation. The material is then poured over a clean 325 mesh screen, the container is rinsed and this remnant added also. The remaining residue is then washed out into an aluminum pan (weight recorded), and placed under a lamp until completely dry. A simple calculation yields %+325 mesh residue ((sample+pan)−empty pan weight).

In addition to kaolin, the method described herein may be applicable to the treatment of other minerals for producing low residue products. Non-limiting examples of such minerals include calcined alumina, talc, aluminum tri-hydrate (ATH), calcium carbonate, dolomite, and silica.

The present invention is further illuminated by the following non-limiting examples, which are intended to be purely exemplary of the invention.

EXAMPLES

In each of the following examples, percent solids, particle size and % 325 mesh residue were determined on a feed slip. The slip was then screened over a 325 mesh wire vibrating screen, and the solids, particle size, and % 325 mesh residue were again measured. The sample was then flocced with acid to pH 3.0, and pressed using the Shriver Envirotech filterpress and standard lab operating procedures to yield a cake product with solids around 71%. In some instances, residue measurements were made on the resulting wet cake.

Testing Process Description:

Percent solids were measured using the CEM AVC-80 microwave solids tester and standard lab operating procedure as described above.

Particle size was determined using the Sedigraph 5100 and standard lab operating procedures, as described above.

The +325 mesh residue was measured, as described above.

The Yield (Efficiency) was measured by a simple calculation of −325 mesh product weight divided by the total feed weight (×100).

Wet testing for the calcined samples was the same as for the hydrous examples. For the dry sample residues, the filtercake was dried at 105° C., followed by pulverization in the lab mill (two passes). The standard lab operating procedure for calcined kaolins required the sample to be dispersed in water, and placed in a Waring blender for two minutes before testing the +325 mesh residue.

Example 1

Processed Coarse Samples (Samples 1 and 2)

The example below shows a processed coarse sample having a median particle size of approximately 8 microns (Sample 1), screened through a 325 mesh (Sample 2), and the results obtained thereon. This sample was also dried at three various temperatures and the residues only were re-evaluated.

|  | Sample 1 Feed | Sample 2 −325 Mesh |
|---|---|---|
| % Solids | 34.8 | 31.7 |
| +325 Mesh Residue (%) | 0.9964 | 0.0007 |
| Cake % Solids | — | 70.48 |
| 50° C. Dried + 325 Mesh (%) | — | 0.0022 |
| 105° C. Dried + 325 Mesh (%) | — | 0.0050 |
| 200° C. Dried + 325 Mesh (%) | — | 0.0069 |
| −325 Mesh Product (%) | — | 88.2 |

Example 2

Hydrous Kaolin (Samples 3 and 4)

The testing procedure described above was used to measure properties of additional hydrous kaolins. As shown in the following table, the tests were performed on both feed and −325 mesh samples of a fine kaolin having a particle size distribution such that about 85% of the kaolin particles by weight have an ESD of less than 2 microns.

|  | Sample 3 Feed | Sample 4 −325 Mesh |
|---|---|---|
| % Solids | 26.3 | 26.0 |
| +325 Mesh Residue (%) | 0.004 | 0.0001 |
| Cake % Solids | — | 62.85 |
| 105° C. Dried + 325 Mesh (%) | — | 0.0646 |
| −325 Mesh Product Yield (%) | — | 98.3 |

Example 3

Calcined Kaolin (Samples 5, 6, and 7)

For dry residue testing, the samples of a calcined kaolin having a median particle size of about 1.4 microns were dried at 105° C. and pulverized in the lab mill (two passes). The sample was then dispersed in water, placed in a Waring blender for two minutes, and the +325 mesh residue was re-tested. This product was relatively easy to process dry, thus product yield is similar to dry sifting. The wet screened results are shown below:

|  | Sample 5 Feed | Sample 6 −325 Mesh | Sample 7 −400 Mesh |
|---|---|---|---|
| +325 Mesh Residue (%) | 0.001 | 0.0005 | 0.0004 |
| Cake % Solids | — | 53.80 | 54.27 |
| 105° C. Dried + 325 Mesh (%) | — | 0.0010 | 0.0010 |
| −325 Mesh Product (%) | — | 98.0 | — |

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for producing a ceramic body, comprising:
   (a) screening a fluid kaolin slurry;
   (b) flocculating the fluid kaolin slurry to form a flocced kaolin slurry;
   (c) dewatering the flocced kaolin slurry to obtain a kaolin wet cake having a solid content of at least about 50% and having a +325 mesh residue content of greater than 0 ppm and less than or equal to about 50 ppm; and
   (d) forming said kaolin wet cake into a ceramic body;
   wherein said kaolin is not dried to a moisture content of less than 10% at any time between said screening and said forming.

2. The method according to claim 1, wherein the fluid kaolin slurry has a solids content ranging from about 25% to about 75% solids.

3. The method according to claim 1, wherein the fluid kaolin slurry has a solids content of at least about 60%.

4. The method according to claim 1, wherein the fluid kaolin slurry is screened with a 325 mesh or finer screen.

5. The method according to claim 1, wherein the fluid kaolin slurry is screened with a 400 mesh or finer screen.

6. The method according to claim 1, wherein the fluid kaolin slurry is screened with a 600 mesh or finer screen.

7. The method according to claim 1, further comprising dispersing the fluid kaolin slurry with a dispersant prior to flocculation, said dispersing occurring at a pH greater than about 6.5.

8. The method according to claim 1, wherein the kaolin wet cake has a $K_2O$ content of less than about 1,500 ppm.

9. The method according to claim 1, wherein the kaolin wet cake has a $K_2O$ content of less than about 650 ppm.

10. The method according to claim 1, wherein the kaolin wet cake has a residue content of less than or equal to about 20 ppm.

11. The method according to claim 1, wherein the kaolin wet cake has a residue content of less than or equal to about 10 ppm.

12. The method according to claim 1, wherein the kaolin wet cake has a residue content of less than or equal to about 5 ppm.

13. The method according to claim 1, wherein the kaolin wet cake has a residue content of less than or equal to about 2 ppm.

14. The method according to claim 1, wherein the kaolin wet cake has a residue content of less than or equal to about 1 ppm.

15. The method according to claim 1, wherein said flocculating comprises lowering the pH of the fluid kaolin slurry to less than or equal to about 5.

16. The method according to claim 1, wherein the kaolin wet cake is formed into a ceramic body by a method chosen from casting, extruding, pressing and molding.

17. The method according to claim 1, wherein the kaolin comprises a hydrous kaolin.

18. The method according to claim 1, wherein the kaolin comprises a calcined kaolin.

19. The method according to claim 1, wherein the fluid kaolin slurry comprises a blend of hydrous and calcined kaolin.

20. The method according to claim 1, wherein said fluid kaolin slurry further comprises at least one mineral components chosen from talc, halloysite, calcium carbonate, gypsum, feldspar, silica, and nepheline syenite.

21. The method according to claim 1, wherein said kaolin is not dried to a moisture content of less than 15% at any time between said screening and said forming.

22. The method according to claim 1, wherein said kaolin is not dried to a moisture content of less than 20% at any time between said screening and said forming.

23. The method of claim 1, further comprising adding a biocide to said fluid kaolin slurry.

* * * * *